United States Patent [19]

Burstein et al.

[11] Patent Number: 5,721,334
[45] Date of Patent: Feb. 24, 1998

[54] PROCESS FOR PRODUCING ULTRA-HIGH MOLECULAR WEIGHT LOW MODULUS POLYETHYLENE SHAPED ARTICLES VIA CONTROLLED PRESSURE AND TEMPERATURE AND COMPOSITIONS AND ARTICLES PRODUCED THEREFROM

[75] Inventors: Albert H. Burstein, Longboat Key, Fla.; Stephen Li, Lawrenceville, N.J.

[73] Assignee: NewYork Society for the Ruptured and Crippled Maintaining the Hospital for Special Surgery, New York, N.Y.

[21] Appl. No.: 602,878

[22] Filed: Feb. 16, 1996

[51] Int. Cl.$^6$ .................................................. C08F 110/02
[52] U.S. Cl. .......................................... 526/352; 264/126
[58] Field of Search .............................. 264/126; 526/352

[56] References Cited

U.S. PATENT DOCUMENTS

| | | | |
|---|---|---|---|
| 3,847,888 | 11/1974 | Baumgaertner | 260/94.9 |
| 3,944,536 | 3/1976 | Lupton et al. | 260/94.9 |
| 4,110,391 | 8/1978 | Berzen et al. | 264/120 |
| 4,348,350 | 9/1982 | Meier et al. | 264/570 |
| 4,545,950 | 10/1985 | Matooka et al. | 264/210.6 |
| 4,587,163 | 5/1986 | Zachariades | 428/292 |
| 4,820,466 | 4/1989 | Zachariades | 264/119 |
| 4,879,081 | 11/1989 | Keep | 264/101 |
| 4,925,880 | 5/1990 | Stein | 521/98 |
| 5,106,558 | 4/1992 | Kobayashi et al. | 264/119 |
| 5,128,415 | 7/1992 | Bastiaansen et al. | 525/240 |
| 5,189,130 | 2/1993 | Kageyama | 526/352 |
| 5,292,584 | 3/1994 | Howard et al. | 428/327 |
| 5,382,643 | 1/1995 | Howard, Jr. | 526/352 |
| 5,428,079 | 6/1995 | Bastiaansen et al. | 522/161 |
| 5,453,234 | 9/1995 | Gusik | 264/120 |
| 5,466,530 | 11/1995 | England et al. | 428/411.1 |
| 5,468,842 | 11/1995 | Howard, Jr. | 528/481 |
| 5,478,906 | 12/1995 | Howard, Jr. | 526/352 |
| 5,494,629 | 2/1996 | Görden et al. | 264/126 |

FOREIGN PATENT DOCUMENTS

WO 85/03901  9/1985  European Pat. Off. .

OTHER PUBLICATIONS

T. Hashimoto, K. Nagatoshi, A. Todo, H. Kawai, 'Superstructure of High Density Polyethylene Film Crystallized from Stressed Polymer Melts as Observed by Small Angle Light Scattering; Polymer 17, 1075, 1976.

van Aerle, 'A Real Time Drawing Study of Melt–Crystal-lized UHMWPE. Comparison with Conventional X–ray Results', Makromo. Chem., 189, 1569 (1988).

S.B. Clough, 'High Temperature X–ray Diffraction from Drawn and Stressed–Crystallized Polyethylene', Polymer Letters, 8, 519, (1970).

M. Yasuniwa, C. Nakafuku, 'High Pressure Crystallization of Ultra High Molecular Weight Polyethylene High Molecular Weight Polyethylene'; Polymer Journal 19(7, 805 (1987).

M. Yasuniwa, S. Tsubakihara, C. Nakafuku, 'Molecular Weight Effect on the High Pressure Crystallization of Polyethylene', Polymer Journal, 20(12), 1075 (1988).

S. Sawada, K. Kato, T. Nose, 'Molecular Weight Dependence of the Formation of Extended–Chain Crystals in Polyethylene Under High Pressure', Polymer Journal, 11(7), 551 (1979).

K. Nagata, K. Matsushige, T. Takemura, 'Transformation Processes in Crystalline Polymers under High Pressure by PSPC x–ray System', Kyushi Daigaku Shuho 50(6), 681 (1977).

Jirous, et al., "UHMW–PE: Processability of Domestic Production Samples, Effect of Processing on Mechanical Properties of a Model Product", *Iternational Polymer Science and Technology*, vol. 17 No. 6, 1990.

Allan F. MArgolies, "Effect of Molecular Weight on Properties of HDPE", *SPE Journal*, vol. 27, Jun. 1971.

*Primary Examiner*—Mary Lynn Theisen
*Attorney, Agent, or Firm*—Morgan & Finnegan, L.L.P.

[57] ABSTRACT

Shaped articles made from molded ultra high molecular weight polyethylene (UHMWPE) with an average molecular weight of between about 1 million and about 10 million and exhibiting a low modulus of elasticity throughout the shaped article or in selected regions of the shaped article are disclosed. These articles are produced by filling a mold with powdered UHMWPE, covering the mold with a piston, raising the temperature of the mold and its contents to between about 140° and about 225° C. while simultaneously applying a pressure of between about 2.5 and about 15 MPa to the mold and its contents, maintaining the pressure and temperature for between about 5 and about 25 minutes, with the time selected dependent upon the thickness of the molded part, then dropping the temperature of the molded part, either completely or in part at a rate between about 4° and about 175° C./minute either while maintaining the mold at the molding pressure, at pressure less than the molding pressure or under no external applied pressure. The shaped articles so produced exhibit a combination of properties including an elastic modules between about 500 MPA and about 800 MPA, a yield strength equal to or greater than about 20 Mpa, an elongation to rupture of greater than about 300%, crystallinity and density less than or equal to about that of the native powdered UHMWPE used to form the part and a melting point less than or equal to about that of native UHMWPE powder that has experienced melting and cooling at ambient pressure. The shaped articles are useful as the bearing surface of total knee joints, prosthetic hip joint cups and as other prosthetic shapes for replacement of other joints of the human body.

36 Claims, 2 Drawing Sheets

# 5,721,334

PROCESS FOR PRODUCING ULTRA-HIGH MOLECULAR WEIGHT LOW MODULUS POLYETHYLENE SHAPED ARTICLES VIA CONTROLLED PRESSURE AND TEMPERATURE AND COMPOSITIONS AND ARTICLES PRODUCED THEREFROM

BACKGROUND AND OBJECTS OF THE INVENTION

The present invention relates generally to ultra-high molecular weight polyethylene (UHMWPE) materials, and in particular to UHMWPE materials exhibiting a modulus of elasticity up to 50% lower than that produced by conventional molding processes, to articles produced therefrom, and to a process for their production. This novel low modulus UHMWPE, in the form of a shaped article, exhibits a unique combination of properties making the material useful as a bearing surface, in general, but particularly useful as the bearing surface for prosthetic knee joints, prosthetic hip joints and as bearing components for other prosthetic replacement joints for the human body.

The UHMWPE components of orthopaedic implants such as the tibial plateaus and patellar buttons of prosthetic knee implants, and the acetabular cups of prosthetic hip implants, are currently manufactured either by machining the component from a solid block of UHMWPE resin, or by molding the component from the native UHMWPE powder. If the former method is used, the UHMWPE component is typically machined from ram extruded, block-molded or "enhanced" UHMWPE stock material. Champion, et al., Trans. ORS 19, 585 (1994) describes the results of a typical manufacture of ram extruded and block molded UHMWPE by conventional low pressure and low temperature techniques to produce an UHMWPE material with an elastic modulus between approximately 900 MPa and 1,400 MPa. U.S. Pat. No. 5,037,928 describes the manufacture of "Enhanced" UHMWPE by treating an extruded bar of UHMWPE with high temperature and pressure for an extended period of time to produce an UHMWPE material with an elastic modulus above that of conventional molded or extruded polyethylene (above 1,700 and below 4,800 MPa).

Components for use in orthopedic implants have also been produced via a molding process whereby the finished shape, or near finished shape, of the UHMWPE component is produced by conventional molding techniques using the native UHMWPE powder. But these techniques also produce UHMWPE materials in excess of 900 MPa. For example, U.S. Pat. No. 4,110,391 discloses a typical process for molding UHMWPE powder using temperatures and pressures of conventionally low magnitude to produce a shaped UHMWPE material of conventional modulus.

One of the major problems experienced with total joint implants, in particular total knee prostheses produced using the above-discussed methods, is wear and surface damage of the UHMWPE component to produce deleterious UHMWPE particles. Therefore, it is desirable to produce an UHMWPE article suitable for use in total joint implants in which wear is minimized. Since it is known that the wear and surface damage of an UHMWPE component is related to the magnitude of the contact stress experienced by the UHMWPE bearing surface under load and during articulation, reduction of this contact stress may provide one way of minimizing debris generation due to wear and surface damage in the UHMWPE article.

Bartel, et al. Trans of the ASME, 107, 193–199 (1985) discloses that contact stress is a function of the elastic modulus of the bearing material in a contact bearing joint such as a knee joint. Thus, one solution to the problem of wear and debris generation in a UHMWPE article is to produce a UHMWPE material with the lowest possible modulus which still retains the desirable strength properties of conventional UHMWPE. But neither conventional block molded nor ram extruded UHMWPE, nor the enhanced UHMWPE produced by high temperature and pressure processes, exhibits a modulus of elasticity less than 900 MPa. Nor does the art teach how these processes can be modified to produce a low modulus UHMWPE.

UHMWPE has also been manufactured by processes which incorporate a rapid quenching or cooling step. For example, U.S. Pat. No. 3,944,536 discloses the use of rapid cooling, but does so in order to produce a material having a modulus above 900 MPa. In that process, pressures from approximately 200 to 700 MPa are employed during the cooling phase for the purpose of obtaining a high modulus UHMWPE.

Thus, one object of the present invention is to provide a process that produces a low modulus UHMWPE (i.e., between about 500 MPa and about 800 MPa) using forming techniques similar to those used to produce conventional UHMWPE from the native powder. Other objects of the present invention are to produce low modulus UHMWPE compositions and near shaped or finished shaped parts from UHMWPE that have uniformly low modulus or selected regions of low modulus distributed throughout the article.

The foregoing specific objects and advantages of the invention are illustrative of those which can be achieved by the present invention and are not intended to be exhaustive or limiting of the possible advantages which can be realized. Thus, these and other objects and advantages of the invention will be apparent from the description herein or can be learned from practicing the invention, both as embodied herein or as modified in view of any variations which may be apparent to those skilled in the art. Accordingly, the present invention resides in the novel parts, constructions, arrangements, combinations and improvements herein shown and described.

SUMMARY OF THE INVENTION

Briefly described and as preferably embodied, the shaped UHMWPE article exhibits: (1) an elastic modulus of between about 500 MPa and about 800 MPa, (2) a yield strength greater than or equal to about 20 MPa, (3) an elongation to rupture greater than about 300%, (4) a crystallinity less than or equal to about that of the native powdered UHMWPE used to form the part (typically less than about 60% crystallinity), (5) a density less than or equal to about that of the native powdered UHMWPE used to form the part (typically less than about 0.935 g/cc), (6) a melting point of the molded UHMWPE less than or equal to about that of the native UHMWPE powder which has been previously melted (typically less than about 140° C.) and cooled at ambient pressure, and (7) an average molecular weight of between about 1 million and about 10 million (as determined by conventional viscosity methods such as ASTM D-4020).

Briefly described and as preferably embodied, the process for obtaining the shaped article of the invention involves five (5) steps:

1. filling a mold with powdered UHMWPE;
2. covering the mold with a piston;
3. raising the temperature of the mold to between about 140° and about 225 ° C. while simultaneously applying a pressure of between about 2.5 and about 15 MPa to the mold and its contents;

4. maintaining the pressure and temperature substantially as selected in step 3 for between about 5 to about 25 minutes, with the time selected dependent upon the thickness of the molded part wherein the time selected is the time necessary to allow the mold contents to equilibrate at the selected temperature; and 5. dropping the temperature of the molded part, either completely or in part at a rate between about 4° and about 175° C./minute, either while maintaining the mold at the molding pressure, at pressure less than the molding pressure, or under no external applied pressure. Dropping the temperature of the molded part may be accomplished either by cooling the part directly by contact with a suitable cooling fluid such as water or air or by cooling the mold.

It will be appreciated by those skilled in the art that the foregoing brief description and the following detailed description are exemplary and explanatory of the invention, but are not intended to be restrictive thereof or limiting of the advantages which can be achieved by the invention. Thus, the accompanying drawings referred to herein and constituting a part hereof, illustrate preferred embodiments of the invention and, together with the detailed description, serve to explain the principles of the invention.

DETAILED DESCRIPTION OF THE INVENTION

Figure 1:
FIG. 1 is a transmission electron micrograph of structures in a microtomed section of an extruded bar of UHMWPE made from 4150 HP resin of Example 4, showing the relatively large lamallae.

In step 1, the powdered UHMWPE in the process of the invention can include any commercially produced UHMWPE powder with a molecular weight between about 1 million and about 10 million (as determined by conventional viscosity methods), and in addition, any ground, morselized or pelleted form of UHMWPE suitable for use in the molding process. Preferrably, the molecular weight of the UHMWPE powder is between about 2 million and about 6 million.

In steps 1 and 3, the mold may be either at room temperature or at an elevated temperature, but not above the melting point of the starting powder, at the time the powder is added. The mold may be raised to a temperature between about 140° and about 225° C. before or during the application of between about 2.5 MPa and about 15 MPa of pressure.

The mold used to produce the low modulus UHMWPE may be constructed so as to produce bars or sheet stock of low modulus UHMWPE which is suitable for the manufacture of a finished component. In a preferred embodiment, the mold may be constructed so as to produce near finished shape articles of low modulus UHMWPE which require only minimal machining to produce the finished component. In a particularly preferable embodiment of the invention, the mold may be constructed to produce a finished component of low modulus UHMWPE.

Various methods may be used to quench or cool the mold. In one embodiment of the invention, the mold may be cooled by external quenching of the mold in any suitable cooling fluid such as air, water, oil and the like. The mold may also be quenched by passing fluid through a labyrinth in the mold. Alternatively, combinations of any of the above quenching processes may be employed to obtain selected elastic moduli for selected regions of the mold. The quench rate is controlled by the temperature of the quenching fluid, the conductivity of the quenching fluid and its flow rate through or around the mold.

Partial quenching of the molded part will result in a shaped article incorporating low modulus UHMWPE adjacent to the quenched surface. Total quenching of the molded part will result in a shaped article with low modulus UHMWPE distributed throughout the bulk of the molded part with the exception of internal regions of molded articles with thick sections of greater than between about 5 to about 15 millimeters in thickness.

The process according to the invention is illustrated in more detail in the following examples of tests from each of the experiments. The starting materials for Experiment I, tests 1–16 were 1900 resin produced by Himont or 415 GUR resin produced by Hoechst/Celanese in the powder form. The powders were directly molded to the shape of ASTM D638, Type V tensile specimens using a Carver 2699 hydraulic press with heated platens under a variety of conditions as set forth in Table 1 entitled "Experiment I, Summary of Tests and Physical Property Data".

Three values were chosen for each of the experimental variables of pressure, temperature and cooling rate: pressures of 2.55, 5.11 and 7.66 MPa; temperatures of 145° C., 165° C. and 200° C.; and cooling rates of 4°, 10°, and 175° C./min. Fifty-four (54) different combinations of the three values of the three variables and two materials are possible. However, rather than conduct 54 separate tests, a D-optimal design was implemented with a quadratic model (using RS/Discover software) to select 16 of the 54 possible combinations to exemplify the process of the invention.

Five tensile specimens were produced during each test. Tensile elastic modulus, ultimate tensile strength, and elongation to break were measured in accordance with ASTM D638. Density and crystallinity were measured with a density gradient column and differential scanning calorimetry respectively.

The experimental conditions employed for tests 1–16 (comprising Experiment 1) are listed in the first five columns of Table 1. The procedure for Test 9 is set forth below as Example 1, and is illustrative of the general procedure used to carry out tests 1–16. These examples (as well as the examples set forth later in this disclosure) are non-limiting and are intended to illustrate the basic principles and unique advantages of the present invention. Various changes and modifications may be made without departing from the spirit and scope of the present invention.

EXAMPLES

Example 1 (test 9)

Powdered 415 GUR resin was placed into the 5 molds in the shape of ASTM D638, type V tensile specimens, and covered on both surfaces with stainless steel plates. Sufficient powder was used to ensure a fully dense specimen. The platens of the press were heated to 200° C., and the mold was placed between the platens. The pressure was raised to 7.66 MPa using a Carver 2699 hydraulic press for a period of time in excess of five minutes. The pressure was released, and the mold was then quenched in water to achieve a cooling rate of approximately 175° C. per minute. Measurement of the physical properties of the five specimens yielded mean values of 580.8 MPa for the modulus, 19.5 MPa for the yield strength, 400% elongation, ultimate tensile strength of 28.3 MPa, and a crystallinity of 47.5%. Tests 1–8 and 10–16 were conducted similarly using the process parameters set forth in Table 1.

The results of the physical testing for all 16 tests are set forth in the last five columns of Table 1. Each value is an average taken from 3 to 5 samples. Elastic modulus values ranged from 580 to 880 MPa (52% range). Elongation to break ranged from 286 to 400% (40% range). Ultimate tensile strength varied from 26 to 42 MPa (50% range). Resultant average density values ranged from less than 0.9232 to 0.9338 g/cc (greater than 0.5% range), while resultant crystallinity values fell within 46 to 61% (33% range).

between about 195° C. and about 215° C. The preferred range for the pressure of the process of the invention is between about 2.5 MPa and about 15 MPa; the more preferred pressure range is between about 5 MPa and about 12.5 MPa; and the most preferred pressure range is between about 7.5 MPa and about 10 MPa. The preferred cooling rate of the process of the invention is greater than about 10° C. per minute, the more preferred cooling rate is greater than about 100° C. per minute; and the most preferred cooling rate is about 175° C. per minute.

The most preferred embodiment of the process of the invention was obtained at 7.66 MPa pressure, 200° C. temperature, and 175° C./min cooling rate using 415 GUR resin as starting material (Experiment I, Test 9) and resulted in an elastic modulus of 581 MPa. Modeling based on the results from these 16 tests predicted that a similar low modulus value cannot be obtained with 1900 resin. The

TABLE I

Experiment 1 - Summary of Tests 1–16 and Physical Property Data

| Test | Resin | Pressure MPa | Temp °C. | Cooling Rate °C./min | Modulus MPa | Yield MPa | Elong % | UTS MPa | Crystallinity % |
|---|---|---|---|---|---|---|---|---|---|
| 1 | 415 | 2.55 | 145 | 4 | 824.8 | 24.3 | 298 | 37.3 | 49.2 |
| 2 | 415 | 2.55 | 165 | 175 | 706.6 | 19.6 | 373 | 28.7 | 46.9 |
| 3 | 415 | 2.55 | 200 | 10 | 800.7 | 24.0 | 382 | 34.9 | |
| 4 | 415 | 5.11 | 145 | 10 | 801.6 | 23.5 | 366 | 35.6 | |
| 5 | 415 | 5.11 | 200 | 4 | 679.7 | 23.8 | 356 | 34.1 | |
| 6 | 415 | 7.66 | 145 | 175 | 690.6 | 21.0 | 326 | 28.3 | |
| 7 | 415 | 7.66 | 165 | 4 | 749.7 | 23.4 | 370 | 36.5 | |
| 8 | 415 | 7.66 | 200 | 10 | 714.6 | 21.5 | 342 | 30.0 | |
| 9 | 415 | 7.66 | 200 | 175 | 580.6 | 19.5 | 400 | 28.3 | 47.5 |
| 10 | 1900 | 2.55 | 145 | 175 | 667.8 | 21.6 | 312 | 28.4 | |
| 11 | 1900 | 2.55 | 165 | 10 | N/A | 24.4 | 298 | 39.6 | |
| 12 | 1900 | 2.55 | 200 | 4 | 880.9 | 22.0 | 342 | 42.0 | 60.8 |
| 13 | 1900 | 2.55 | 200 | 175 | 662.8 | 21.5 | 393 | 33.2 | |
| 14 | 1900 | 7.66 | 145 | 4 | N/A | 24.3 | 286 | 41.5 | 58.5 |
| 15 | 1900 | 7.66 | 165 | 175 | 727.9 | 20.3 | 360 | 32.5 | |
| 16 | 1900 | 7.66 | 200 | 4 | 809.2 | 22.8 | 304 | 42.1 | 60.5 |

| Material | Resin | Modulus MPa | Yield MPa | Elongation % | UTS MPa | Crystallinity % |
|---|---|---|---|---|---|---|
| Reference* UHMWPE | 4150 HP | 915.8 | 23.8 | 390 | 48.8 | 59.4 |
| Previous Reports[2] | 415 GUR | 1353–1593 | 21.6–23.3 | 304–384 | 30.5–40.6 | NR |

N/A not enough samples to provide modulus data.
*Extrusion molded
[2]Champion, et al., Trans. ORS 19, 585 (1994)

Tests 1–16 demonstrate that the variation of resin type, pressure, temperature and cooling rate all affect the physical properties of UHMWPE. The relationships and trends were modeled using RS/Explore software and statistically significant differences were obtained for each variable. To illustrate, comparing tests 12 and 13, a change in the cooling rate from 4° to 175 ° C./min with all other variables held constant (1900 resin, 2.55 MPa, 200° C.) produced a 25% decrease in the elastic modulus (p<0.02). Similarly, comparing tests 3 and 8 illustrates that increasing molding pressure from 2.55 to 7.66 MPa while holding the other variables constant (415 resin, 200° C., 10° C./min cooling rate) decreased ultimate tensile strength by 16% (p<0.008).

Based upon the preceding experiment, the preferred range for the temperature of the process of the invention is between about 140° C. and about 225° C., the more preferred temperature range is between about 165° C. and about 225° C., and the most preferred temperature range is maximum ultimate tensile strength of 42 MPa was obtained with 1900 resin under several different conditions (Tests 12, 14, 16).

EXPERIMENT II

Experiment II was conducted to determine the effect of cooling rate (quenching) on molded blocks of the approximate size of total knee joint tibial bearing components.

Tests 1–16 also demonstrate that the mechanical properties of UHMWPE molded from a single resin can be altered significantly by the processing conditions. The relationships are complex, and for any one factor, that factor's influence on properties is dictated by the values of the remaining factors. In particular, the effect of cooling rate has a marked effect on the mechanical properties of the molded UHMWPE, as Tests 1–16 demonstrate. It should be recognized that for each starting resin material a different set of optimum temperature and pressure conditions will be obtained by repeating Experiment I. However, the lowest modulus will be obtained at that pressure/temperature condition by using the highest cooling rate. Tests 1–16 also illustrate that variation of molding, pressure, temperature, and cooling rate can produce a molded UHMWPE with properties significantly different from those of commercially available UHMWPE. For example, the modulus of 581 MPa obtained in Test 9 is 50% less than that of commercially available UHMWPE (p<0.002). Experiment I also demonstrates as seen in test 12 that certain combinations of pressure and temperature produce less preferred embodiments of the invention.

Tests 17–20 which constituted Experiment II, used powdered GUR 4150, lot 47B resin, or Himont 1900 resin to form molded sheet stock 127 mm by 127 mm by 21.6 mm (approximately). The procedure is described in detail in Example 2.

Example 2 (Test 17)

A square steel molding die, approximately 127 mm by 127 mm was fitted with two sliding plates (pistons) of approximately 6.4 mm thickness. Approximately 300 g of GUR 4150 powder was placed in the die which was then placed into a Carver 2518 hydraulic press. The platens were heated to 205° C. and a total force of 27,700 pounds was applied producing a pressure of approximately 11,100 psi or 7.66 MPa.

Once the mold was placed between the heated platens, approximately 5 minutes was allotted for the platens to return to their original set temperature. Twenty minutes was then allotted for the powder to melt and equilibrate to the set temperature. This time was based on experiments which showed that times of approximately eight minutes were insufficient to obtain complete melting of the powder (resulting in the central quarter of the powder mass remaining in the unmelted state). Fifteen minutes was estimated as the minimum time for complete melting of the powder, and twenty minutes as the minimum time to obtain thermal equilibrium of the 300 grams of powder. The mold was then removed from the press, and placed in a water bath maintained at 0° C. The bath was held at 0° C. throughout the cooling period (approximately 10 minutes).

The blocks were then cut into 4 millimeter thick sheets, such that the sheets lie in the direction parallel to the surface of the blocks. Three such 4 millimeter sheets were obtained throughout the thickness of the block, and these sheets were then cut into the shape of the ASTM D638, type V tensile specimens using a contour routing machine. The mechanical properties of the test specimens were measured and are summarized in Table 2 entitled "Experiment II, Summary of Physical Properties—Tests 17–20". Tests 18–19 were carried out and analyzed similarly and are also reported in Table 2.

TABLE 2

Experiment II - Summary of Physical Properties
Tests 17–20

| Test | Specimen No. | Location | Modulus MPa | Yield Stress MPa | Elongation To Break % | Ultimate Tension Stress MPa |
|---|---|---|---|---|---|---|
| 17 | 951126 | Surface | 707 ± 89 | 21.6 ± 0.6 | 330 ± 50 | 38.0 ± 6.6 |
|  |  | Center | 727 ± 34 | 20.8 ± 0.6 | 303 ± 54 | 32.5 ± 4.6 |
| 18 | 951012 | Surface | 753 ± 41 | 21.1 ± 0.7 | 349 ± 36 | 38.2 ± 3.7 |
|  |  | Center | 924 ± 56 | 21.4 ± 1.1 | 341 ± 31 | 36.9 ± 1.4 |
| 19* | 951118 | Surface | 685 ± 12 | 21.5** | 308 ± 29 | 40.9 ± 2.3 |
|  |  | Center** | 814 | 20.5 | 374 | 42.8 |
| 20*** | 951004 | Bottom | 812 ± 6 | 21.2** | 330 ± 31 | 35.3** |
|  |  | Center | 909 ± 9 | 22.4 ± 0.5 | 358 ± 23 | 43.7 ± 2.5 |
|  |  | Top | 908* |  | 297 |  |

*Himont 1900, the other three tests were GUR 4150
**One specimen
***Bottom surface only quenched, top surface air cooled For 7 specimens machined from the 4 millimeter sheets obtained from the surfaces of blocks molded of GUR 4150 type resin and fully quenched (Examples 17 and 18), a mean modulus of 751 MPa plus or minus 33.3 MPa or an 18% decrease in modulus for the 4150 resin was obtained. This value is significantly lower than the modulus of the reference UHMWPE, which as previously stated in Table 1, is approximately 916 MPa. The 1900 resin, when molded and quenched as stated above, (Test 19) yielded a mean elastic modulus for three specimens of 685 MPa plus or minus 12 MPa. It should be noted that the reference UHMWPE used provided a conservative (low) value of elastic modulus, since all other values for 415 GUR resin in the literature report elastic modulus values of between 1353 and 1593 MPa. Thus the 18% reduction in modulus is a minimum reduction. Actual reductions may be on the order of 50% (see Table 1) when compared to more conventional UHMWPE materials.

Example 3 (Test 20)

In Experiment II, Test 20, a block of UHMWPE was molded from GUR 4150 resin using the same mold die, press pressure and temperature as in Example 2. However, in test 20, after molding was completed, the bottom of the die was quenched in room temperature water. The top of the die was allowed to cool slowly, such that at three minutes its temperature had declined to 190° C., at 15 minutes it had declined to 161° C., and at twenty minutes it had declined to 143° C. The top of the die did not reach room temperature until more than an hour had passed.

The resulting block of UHMWPE was sectioned as described in Example 2, and the elastic modulus of the portion of the material adjacent to the quenched piston measured. An average modulus of 812 plus or minus 6 MPa was obtained for the two specimens. The elastic modulus of material taken from the surface of the specimen adjacent to the slowly cooled piston was 908 MPa. Thus, the surface of the molded block quenched in room temperature water had an elastic modulus of approximately 11% less than that of the air cooled portion of the block.

EXPERIMENT III

Contact Stress Measurements

Experiment III was conducted to demonstrate that a reduction in modulus produces a concomitant reduction in contact stress. In test 21, quenched material blocks exhibiting an average surface modulus of approximately 750 MPa were subjected to forces of 2000N using indentors shaped as typical condyle structures of artificial knee joints. An average pressure of 21.5 MPa was measured over the contact surface area. Test 22, using the method of test 21 but with the reference polyethylene material, yielded an average contact pressure of 23.8 MPa. The 10% reduction in contact pressure is in substantial agreement with what Barrel, et al. predicts for an 18% reduction in elastic modulus. (See Barrel, Burstein, Toda, Edwards "The Effect of Conformity and Plastic Thickness on Contact Stresses in Metal Backed Plastic Implants" Trans. of ASTM, 107, 193–199, (1985)).

Since wear and material degradation in total knee prostheses is a result of a fatigue process, a 10% reduction in contact stress would yield a meaningful extension of the fatigue life of the tibial component of a total knee prosthesis. It is well known that the fatigue life of a material is an exponential function of the stress. Thus, a 10% reduction in contact stress may extend the useful life of an artificial knee joint by several years. It must be emphasized that the contact stress value measured above compares a polymer test block of nominally low modulus with the modulus of all other published and measured UHMWPE material. Consequently, the advantages we present herein are the minimum advantages obtainable by following the process of the invention, and the actual advantages that would accrue to the user of this material in artificial knees and similar artificial joint replacements may be substantially above those stated here.

EXPERIMENT IV

To further identify the nature and structure of the material produced by the process of this invention, Experiment IV was conducted to determine the material's melting point, crystallinity and density.

In general, the melting point and crystallinity of as-synthesized UHMWPE powder is 145°–146° C. and 64–90%. However, whenever the powder is subjected to temperatures above its melting point and then allowed to cool, the melting point decreases to values between 134°–138° C. and the crystallinity decreases to values around 50%. Subsequent melting and cooling treatments cause no further significant changes in either melting point or crystallinity. Commercially obtained UHMWPE shapes (such as bar and sheet material made either by a ram extrusion process or by a compression molding process) exhibit these heat-induced changes in melting point and crystallinity. The actual temperature and pressure conditions used to produce these commercial materials, however, are unknown, and proprietary to the suppliers of these shaped articles. For comparative purposes tests 23–32 were conducted using either 415 OHP, 413 GUR, 415 GUR or 1900 power. The results are summarized in Table 3. Table 3 illustrates the melting point and crystallinity of commercially obtained as received powder (presumed to be as-synthesized), that has been subjected to temperatures above its melting point and then cooled, as well as extrusion molded bars made of the same powder resin.

EXPERIMENT IV

TABLE 3

Melting Point, Crystallinity and Density of Commercial Materials

| Test | Material | Form | Melting Point, C. | Crystallinity % |
|---|---|---|---|---|
| 23 | 4150 HP | powder, as received | 145.8 | 64.3 |
| 24 | 4150 HP | powder, melted & cooled | 136.3 | 50.2 |
| 25 | 4150 HP | extruded bar | 136.4 | 51.2 |
| 26 | 1900 | powder, as received | 145.9 | 89.5 |
| 27 | 1900 | powder, melted & cooled | 138.0 | 55.9 |
| 28 | 1900 | extruded bar | 137.3 | 51.4 |
| 29 | 413 GUR | powder, as received | 145.8 | 72.0 |
| 30 | 413 GUR | powder, melted & cooled | 137.3 | 49.8 |
| 31 | 415 GUR | powder, as received | 145.6 | 64.0 |
| 32 | 415 GUR | powder, melted & cooled | 135.9 | 51.8 |

For additional comparison, the process for producing "enhanced UHMWPE" set forth in U.S. Pat. No. 5,037,928, which uses temperatures and pressures much higher than those in the process of this invention, produces an UHMWPE material in which the melting point and crystallinity of UHMWPE increases after it has been melted. To determine the melting point, crystallinity and density of the materials produced by the present invention, tests 33–39 were conducted and the results are summarized in Table 4.

Unlike the process reported in U.S. Pat. No. 5,037,928, the melting point and crystallinity of the materials produced by the processes of the present invention, (Table 4), are the same or lower than that of the same material that has been melted and cooled at ambient pressures, Table 3. The density of UHMWPE generally mirrors the crystallinity of the material. The density of UHMWPE that has been subjected to melting and cooling processes is typically between 0.930 and 0.940 g/cc. The density of the materials produced using the process described in the current application are the same or lower than these values (Table 4).

TABLE 4

Experiment 4 - Melting Point, Crystallinity and Density
of Materials Derived by the Process of the Invention

| Test | Sample* | Resin | Description | Melting Point | Crystallinity % | Density g/cc |
|---|---|---|---|---|---|---|
| 33 | 1 | 415 GUR | Highest Modulus using 415 GUR | 135.3 | 49.2 | <.9278 |
| 34 | 2 | 415 GUR | Lowest UTS | 132.2 | 46.9 | <.9293 |
| 35 | 9 | 415 GUR | Lowest Modulus Highest Elongation | 132.1 | 47.5 | <.9232 |
| 36 | 12 | 1900 | Highest Modulus | 136.7 | 60.8 | .9338 |
| 37 | 14 | 1900 | Lowest Elongation | 137.5 | 58.5 | .9303 |
| 38 | 16 | 1900 | Highest UTS | 136.2 | 60.5 | .9303 |
| 39 | Reference UHMWPE | 4150HP | | 135.5 | 59.5 | .9316 |

*The sample number corresponds to the test numbers of EXPERIMENT I.

EXPERIMENT V

Conventional processes for production of UHMWPE allow cooling to take place at uncontrolled rates, usually by conduction and convection with room air (U.S. Pat. No. 4,110,393) or cooling the processed UHMWPE very slowly (U.S. Pat. No. 5,037,928). In the first case, crystallization proceeds within the normally cooled material, producing the normally expected size of the structurally important lamellae. In U.S. Pat. No. 5,037,928, the temperature drop is controlled so as to occur more slowly than conventional cooling would permit. The process in U.S. Pat. No. 5,037,928 results in a higher degree of crystallinity. In our process, the rapid cooling minimizes the crystallization process that normally occurs during solidification, and produces a material morphology with much smaller lamellae. The process is illustrated with the following example.

Example 4

Figure 2:
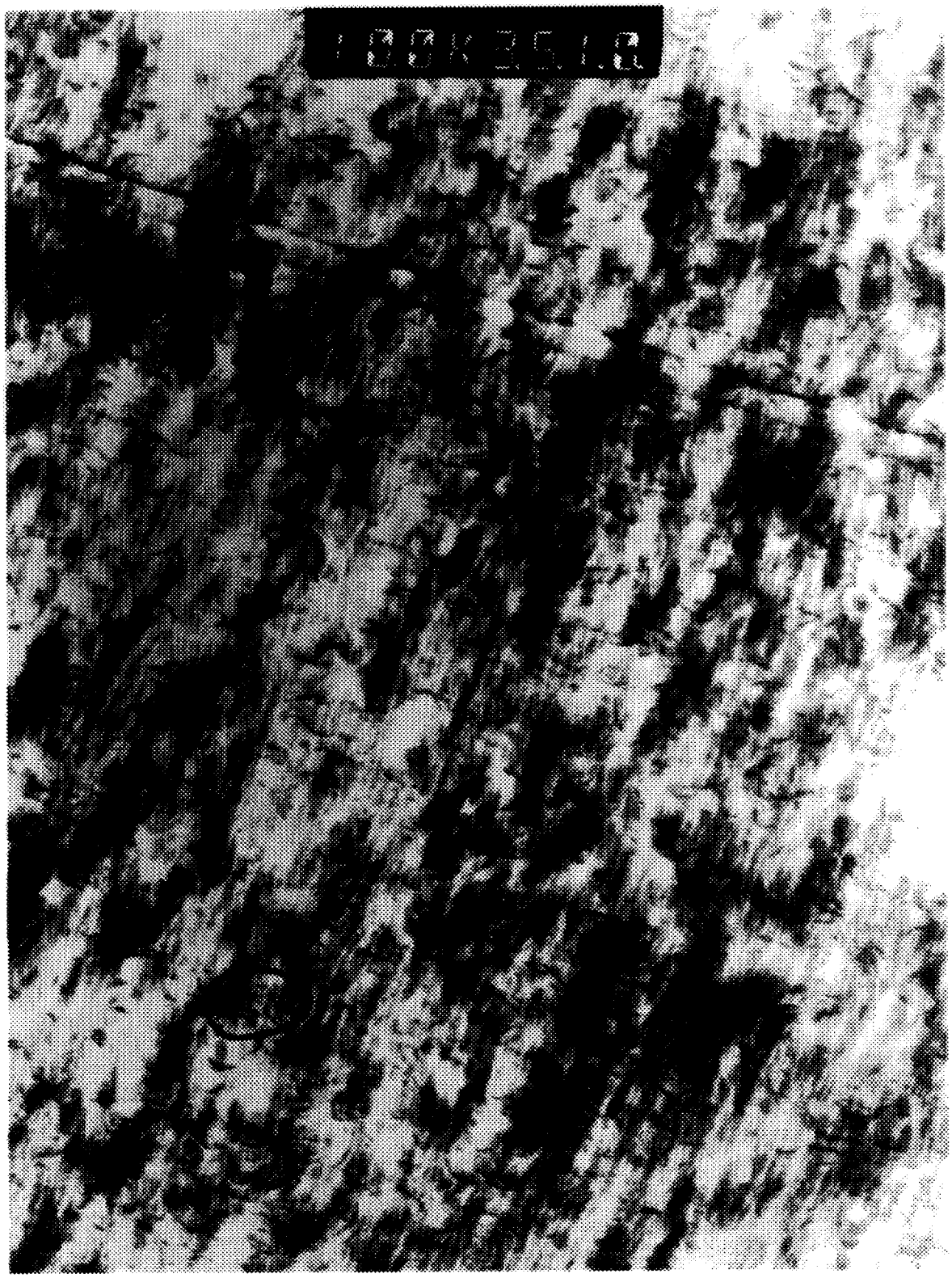
FIG. 2 is a transmission electron micrograph of structures in a microtomed section of a molded specimen from Example 1 (Experiment I, test 9) showing the relatively smaller lamallae.

A portion of an extruded bar of polyethylene made from 4150 HP resin was exposed to concentrated chlorosulfonic acid for two hours at room temperature. A small piece of this treated sample was then embedded in epoxy and a thin section was then obtained with a microtome at room temperature. A Transmission Electron Microscopic (TEM) photograph was then taken (FIG. 1). Next, a specimen from test 9, Experiment I was prepared in the same manner, and the resulting TEM appears as FIG. 2. Comparisons between FIGS. 1 and 2 show that in the conventionally cooled material (FIG. 1) the lamellae are markedly larger than those shown in FIG. 2 (quenched specimen). The TEMs produced the magnification of 10,000x, and the photo enlargements produced an additional 2.5 magnification. Direct measurements of the original photographs showed the conventionally cooled material's lamellae, in the majority, to be consistently greater than 10 mm in length (on FIG. 1, actual length consistently greater than 400 Å), and often 20 mm (800 Å) in length, while direct measurement of the photographic image of the quenched material showed lamellae typically less than 10 mm in length (on FIG. 2, actual length typically less than 400 Å), and often 4 to 7 mm in length (actual length 160 Å to 280 Å). (Actual lengths of the lamellae are smaller by a factor of 2.5×10$^4$.) Thus quenching produces a material with smaller lamellae as compared to normal cooling or slow cooling, by minimizing the time available for crystallization. Other materials can have their own characteristic lamellae sizes when cooled by conventional means or slow cooled. Quenching will reduce the size of these lamellae typically by one half.

The Examples described herein use conventional molding techniques and the quenching of the entire die and molded component or portions thereof. Alternate techniques may be employed to ensure more efficient total quenching, and quenching of selected mold surfaces. One such method is to provide labyrinth cooling passages in those portions of the dies where cooling is desired. Utilizing this method, various cooling fluids could be pumped through the labyrinth at the conclusion of the molding process, thereby enhancing and controlling the quench rate and hence the obtained mechanical properties. In this process, insulating material can be inserted between the die and the heated platen of the press at the conclusion of the pressing process, and after restoring molding pressure, cooling fluid could be circulated in the labyrinth to provide the desired quenching. If a more uniform property is desired, then all surfaces of the die could be so cooled while maintaining pressure on the specimen to enhance heat transfer rates. Alternatively, the molding dies or portions thereof could be both heated and cooled by circulating fluids, or heated by electric current and cooled by circulating fluid.

Alternatively, it may be desired to produce structures in which only a portion of the structure contains the low modulus material. For example, this would be the case when making a tibial component entirely from UHMWPE, without the use of metal backing. The stem of the prosthetic component would preferably have higher modulus to enhance load transfer to the bone, while the bearing surface of the component would have lower modulus to minimize contact stress and hence maximize wear life.

While the specific examples presented used 413 GUR, 415 GUR, 4150 GUR, and 1900 UHMWPE resins, other resins may be used. The process is generally applicable to other high molecular weight, semi crystalline polymers including, but not limited to: copolymers of ethylene, branched forms of polyethylene, polyesters, ionomers, polytetrafluoroethylene, polyamides, and polyimides. The process is also generally applicable to mixtures of UHMWPE resins and mixtures of UHMWPE resin(s) with other high molecular weight, semi crystalline polymer(s) that have a high degree of miscibility.

It will be appreciated by those skilled in the art that the present invention in its broader aspects is not limited to the particular embodiments shown and described herein, and that variations may be made which are within the scope of the accompanying claims without departing from the principle of the invention and without sacrificing its chief advantages.

What is claimed is:

1. A process for preparing a shaped article of an ultra high molecular weight polyethylene exhibiting an elastic modulus of between about 500 MPa and about 800 MPa comprising the following steps:
   (a) filling a mold with powdered ultra high molecular weight polyethylene;
   (b) covering the mold with a piston;
   (c) raising the temperature of the mold to between about 140° and about 225° C. while simultaneously applying a pressure of between about 2.5 and about 15 MPa to the mold and its contents;
   (d) maintaining the pressure and temperature substantially as selected in step (c) for between about 5 to about 25 minutes, with the time selected dependent upon the thickness of the molded part, wherein the time selected is the time necessary to allow the mold contents to equilibrate at the selected temperature; and
   (e) dropping the temperature of the molded part, either completely or in part, at a rate between about 4° and about 175° C./minute, either while maintaining the mold at the molding pressure, at a pressure less than the molding pressure or under no external applied pressure wherein dropping the temperature of the molded part may be accomplished either by cooling the part directly by contact with a suitable cooling fluid such as water or air or by cooling the mold.

2. The process of claim 1 wherein in step (a) the mold is at an elevated temperature at the time the powder is added.

3. The process of claim 1 wherein in step (c) the temperature range is between about 165° and about 225° C. and the pressure is between about 5 MPa and about 12.5 MPa.

4. The process of claim 3 wherein in step (a) the mold is at an elevated temperature at the time the powder is added.

5. The process of claim 1 wherein in step (c) the temperature range is between about 195° and about 215° C. and the pressure is between about 7.5 MPa and about 10 MPa.

6. The process of claim 5 wherein in step (a) the mold is at an elevated temperature at the time the powder is added.

7. An ultra high molecular weight polyethylene exhibiting an elastic modulus of between about 500 MPa to about 800 MPa formed by the process comprising the steps of:
   (a) filling a mold with powdered ultra high molecular weight polyethylene;
   (b) covering the mold with a piston;
   (c) raising the temperature of the mold to between about 140° and about 225° C. while simultaneously applying a pressure of between about 2.5 and about 15 MPa to the mold and its contents;
   (d) maintaining the pressure and temperature substantially as selected in step (c) for between about 5 to about 25 minutes, with the time selected dependent upon the thickness of the molded part, wherein the time selected is the time necessary to allow the mold contents to equilibrate at the selected temperature; and
   (e) dropping the temperature of the molded part, either completely or in part, at a rate between about 4° and about 175° C./minute, either while maintaining the mold at the molding pressure, at a pressure less than the molding pressure or under no external applied pressure wherein dropping the temperature of the molded part may be accomplished either by cooling the part directly by contact with a suitable cooling fluid such as water or air or by cooling the mold.

8. The product by the process of claim 7 wherein in step (a) the mold is at an elevated temperature at the time the powder is added.

9. The product by the process of claim 7 wherein in step (c) the temperature range is between about 165° and about 225° C. and the pressure is between about 5 MPa and about 12.5 MPa.

10. The product by the process of claim 9 wherein in step (a) the mold is at an elevated temperature at the time the powder is added.

11. The product by the process of claim 7 wherein in step (c) the temperature range is between about 195° and about 215° C. and the pressure is between about 7.5 MPa and about 10 MPa.

12. The product by the process of claim 11 wherein in step (a) the mold is at an elevated temperature at the time the powder is added.

13. An ultra high molecular weight polyethylene exhibiting an elastic modulus of between about 500 MPa and about 800 MPa.

14. The composition of claim 13 exhibiting a yield strength greater than or equal to about 20 MPa, an elongation to rupture greater than about 300% and an average molecular weight between about 1 million and about 10 million.

15. The process of claim 1 wherein in step (e) the rate of dropping the temperature of the molded part is about 175° C./minute.

16. The process of claim 3 wherein in step (e) the rate of dropping the temperature of the molded part is about 175° C./minute.

17. The process of claim 5 wherein in step (e) the rate of dropping the temperature of the molded part is about 175° C./minute.

18. The product by the process of claim 7 wherein in step (e) the rate of dropping the temperature of the molded part is about 175° C./minute.

19. The product by the process of claim 9 wherein in step (e) the rate of dropping the temperature of the molded part is about 175° C./minute.

20. The product by the process of claim 11 wherein in step (e) the rate of dropping the temperature of the molded part is about 175° C./minute.

21. A process for preparing a shaped article having an elastic modulus of between about 500 MPa and about 800 MPa, comprising the following steps;
   (a) molding ultra high molecular weight polyethylene under elevated temperature and pressure; and
   (b) cooling at least a portion of the molded article at a rate between about 4° C./minute and about 175° C./minute to form the molded article exhibiting an elastic modulus of between about 500 MPa and about 800 MPa.

22. The process according to claim 21, wherein said cooling step is conducted while the shaped article is maintained at the molding pressure.

23. The process according to claim 21, wherein said cooling step is conducted while the shaped article is maintained a pressure below the molding pressure.

24. The process according to claim 21, wherein said cooling step is conducted while the shaped article is maintained under no externally applied pressure.

25. The process according to claim 21, wherein said cooling step is conducted by contacting the molded article directly with a cooling fluid.

26. The process according to claim 25, wherein said cooling fluid is water or air.

27. The process according to claim 25, wherein said cooling step involve indirect cooling whereby a cooling fluid is conveyed through a mold in which said molded article is located.

28. The process of claim 21 wherein said cooling rate is between about 10° C./minute and about 175° C./minute.

29. The process of claim 21 wherein said cooling rate is about 10° C./minute.

30. The process of claim 21 wherein said cooling rate is about 175° C./minute.

31. A process for preparing a shaped article having an elastic modulus of between about 500 MPa and about 800 MP comprising:
   (a) molding ultra high molecular weight polyethylene under a pressure of between 2.5 and 15 MPa and elevated temperatures for a period of time sufficient to equilibrate the ultra high molecular weight polyethylene and form a molded article; and
   (b) quenching at least a part of the molded article to form a molded article having an elastic modulus of between about 500 MPa and about 800 MPa.

32. The composition of claim 13 with a predominance of crystalline lamellae less than 400 Å in length.

33. A process for preparing a shaped article having an elastic modulus of between about 500 MPa and about 800 MP comprising:
   (a) molding ultra high molecular weight polyethylene under a pressure of between 2.5 and 15 MPa and elevated temperatures;
   (b) maintaining the pressure and temperature of step a) for between about 5 and 25 minutes to equilibrate the ultra high molecular weight polyethylene and form a molded article; and
   (c) quenching the molded article of step b) to form a molded article having an elastic modulus of between about 500 MPa and about 800 MPa.

34. A process for preparing a shaped article having an elastic modulus of between about 500 MPa and about 800 MP comprising:
   (a) molding ultra high molecular weight polyethylene under pressure and elevated temperatures;
   (b) maintaining the pressure and temperature of step a) for between about 5 and 25 minutes to equilibrate the ultra high molecular weight polyethylene and form a molded article; and
   (c) quenching the molded article of step b) to form a molded article having an elastic modulus of between about 500 MPa and about 800 MPa.

35. The process according to claim 34, wherein said quenching is at a rate between about 4° C./minute and about 175° C./minute.

36. A molded article comprising:
   ultra high molecular weight polyethylene having an elastic modulus of between about 500 MPa and about 800 MPa, and formed by the process comprising the steps of:
   (a) molding the ultra high molecular weight polyethylene under elevated temperature and pressure; and
   (b) cooling at least a portion of the molded article at a rate between about 4° C./minute and about 175° C./minute.

* * * * *